No. 798,926. PATENTED SEPT. 5, 1905.
C. SCHMIDT.
MOTOR TRUCK.
APPLICATION FILED JAN. 19, 1905.

Witnesses.
F. E. Monteverdt.
M. K. Seely.

Inventor.
Carlos Schmidt,
by Span & Seely
Attorneys

UNITED STATES PATENT OFFICE.

CARLOS SCHMIDT, OF SAN FRANCISCO, CALIFORNIA.

MOTOR-TRUCK.

No. 798,926.      Specification of Letters Patent.      Patented Sept. 5, 1905.

Application filed January 19, 1905. Serial No. 241,854.

*To all whom it may concern:*

Be it known that I, CARLOS SCHMIDT, a citizen of the Republic of Chile, residing at San Francisco, in the county of San Francisco and State of California, have invented certain new and useful Improvements in Motor-Trucks, of which the following is a specification.

My invention relates to wheeled trucks or drays intended for carrying heavy loads and provided with automobile mechanism.

My improvements relate more particularly to the adaptation of driving and steering mechanism to a structure of this particular character, which for convenience in loading and on account of the very heavy loads carried must have its carrying platform or body close to the ground in order to bring the center of gravity as low as possible. This is both for the safety of the load and to facilitate operations on heavy grades.

An embodiment of my invention is shown in the accompanying drawings.

Figure 1:
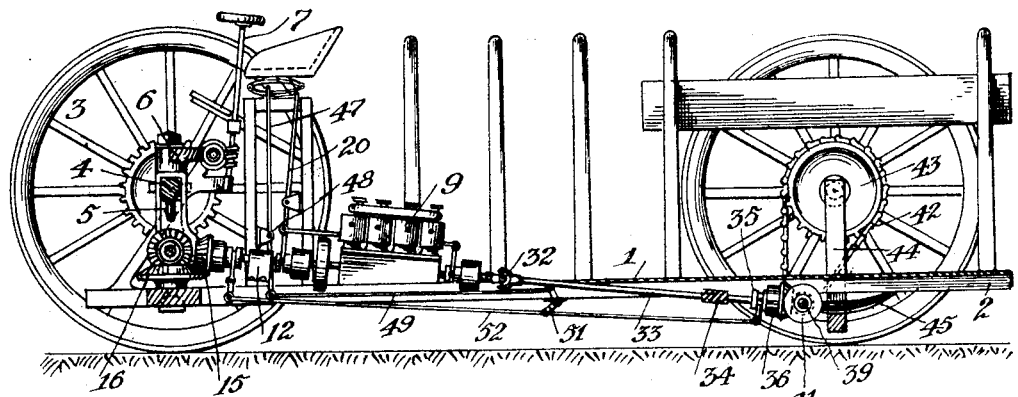
Figure 2:
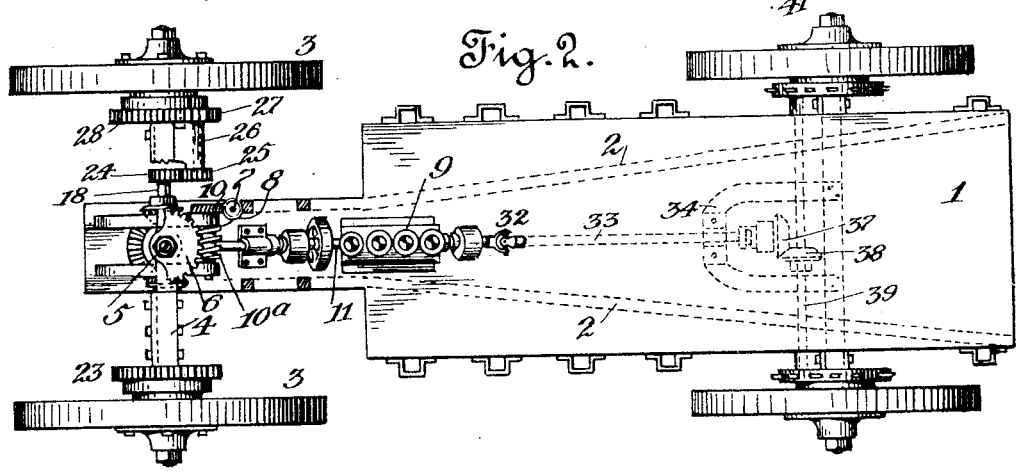
Figures 3, 4:
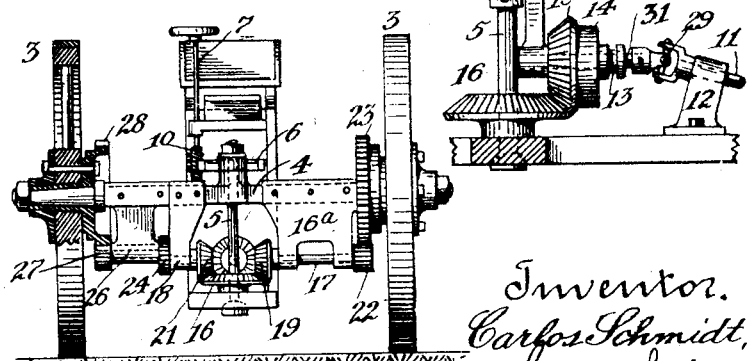

Figure 1 is a side sectional elevation of the truck with driving and steering gearing and connections. Fig. 2 is a plan view. Fig. 3 is a front elevation. Fig. 4 is a detail side elevation of the connection between the motor-shaft and the gearing for transmitting motion to the front wheels of the truck.

The body of the truck is a floor or platform 1, supported and strengthened from beneath by the substantially longitudinal ribs 2 2. The front carrying-wheels 3 are of large size, and their axle 4 is swiveled upon the king-bolt 5, so that in steering the wheels can be turned simultaneously to right or left in the manner of any ordinary bogie truck. On the bolt 5 is a sector 6, having a peripheral worm-gear. The steering-rod 7 has a worm 8, which through the worm-wheel 10 and worm-shaft 10ª transmits motion to the said sector.

I do not limit myself to any particular kind of motor for driving my truck, as one of the many different styles of steam, gasolene, or electrical motors can be used, located in any convenient situation on the truck, preferably near the forward end. The motor 9 is therefore only shown conventionally, and must be taken as illustrative of the numerous types and styles which may be employed. It has any usual means for stopping, starting, or reversing, controlled by lever 20.

Referring to the gearing for driving the front wheels of the truck, the forwardly-projecting motor-shaft 11 is journaled in a bearing 12 and in advance of said bearing is provided with the grooved clutch member 13, which is feathered on the shaft. The construction of such clutches is thoroughly understood by mechanics generally, and I have not considered it necessary to describe such a common mechanical device in detail. The other member 14 of the clutch is a part of the pinion 15, loose on the universally-jointed shaft 31, connected to the engine-shaft 11. The pinion 15 meshes with a loose pinion 16 on the king-bolt, all these parts being supported by suitable brackets or framing, (best shown at 16ª, in Fig. 3.) Journaled in the said brackets or framing are the two transverse shafts 17 18, each of which carries a pinion, (represented, respectively, at 19 and 21,) and which engage with opposite sides of the loose pinion 16, as shown in Fig. 3. The shaft 17 has a spur-pinion 22, which is geared down to one of the front truck-wheels through the spur-gear 23, secured to the hub of said wheel. The shaft 18, in order to drive the other front wheel in the same direction, transmits its motion to said wheel through spur-gears 24 25, a secondary shaft 26, a spur-pinion 27, and a gear 28, bolted to the hub of said wheel. It will be seen that all this driving-gearing for the front wheels is carried by the swiveled forward truck and follows the motions of the latter when steering.

In order to leave the platform clear for the load, I bring the gearing for the rear truck-wheels below the platform. To accomplish this in the most convenient manner, the motor is set upon an inclined bed, as shown in Fig. 1, in order to carry the continuation of the motor-shaft rearwardly and downwardly. In consequence the motor-shaft projects forwardly at the same incline, but upwardly. In Fig. 1 the illustration is not perfectly accurate. The limited space and the necessarily small scale of the parts has made it necessary to carry the motor-shaft up to the pinion 15 on the same incline. In practice, however, the pinion 15 should be at right angles to the pinion 16, and hence I have shown the actual practical construction in Fig. 4. This figure last referred to shows the inclined engine-shaft 11, connected by a universal joint 29 to the shaft 31, on which the clutch member 13 is feathered. This brings the bevel-pinions 15 and 16 into their proper relative positions for driving.

The rearwardly-projecting engine-shaft extends downwardly, passing through a hole in the platform. The shaft is connected by a knuckle-joint 32 to a continuation or extension 33, which is journaled in a bracket 34, secured to the rear axle, as shown by dotted lines in Fig. 2. The purpose of this joint is to protect the engine-shaft so that it can run smoothly and steadily without being affected by the jarring caused by rough pavements, bad roads, &c. On this extension is a sliding and grooved clutch member 35, adapted to engage with or to be released from engagement with a corresponding clutch member 36, forming part of the bevel-pinion 37. Pinion 37 engages with a similar pinion 38, on a transverse shaft 39, which is journaled in the bracket 34. On each end of shaft 39 is a sprocket-wheel 41, from which a chain 42 extends upwardly, and gears down the rear carrying-wheels by means of the larger sprocket-wheels 43, secured to the hubs of said wheels. A V-shaped stirrup 44 is secured to the rear axle, to which are secured springs 45, composed of superimposed leaves, the free ends of which support the main truck-platform in order to absorb the greater part of the vibration caused in travel.

Easily accessible from the driver's seat is the controlling-lever 20, which actuates the starting, stopping, and reversing of the motor through any suitable mechanism customarily employed with or appropriate to the kind of motor employed. Another lever 47, equally accessible, controls the clutches which throw the carrying-wheels into and out of gear with the motor-shaft. This lever 47 is fulcrumed at 48 on some fixed part of the structure, such as the seat-frame, and is jointed to a rod 49. The rod 49 is connected to one arm of a bell-crank 51, pivoted upon the platform. The other arm of the bell-crank is jointed to a rod 52, whose end is connected to the clutch which puts the front wheels into and out of gear and whose rear end is connected to the clutch which performs a similar office for the rear wheels.

By the construction shown I am able to provide an automobile-truck whose motor drives both front and rear wheels positively, in which the motor and driving connections are protected from jar and concussion, in which the driving is so arranged as to leave a practically free platform for the load, in which a very low platform is supported by very large carrying-wheels, and in which a motor carried low upon the platform transmits motion to such large wheels in a practical and simple manner.

I do not limit myself to the exact constructions and arrangements herein described and shown in the drawings, as I desire to avail myself of such modifications and equivalents as fall properly within the spirit of my invention.

Having thus fully described my invention, what I claim as new, and desire to secure by Letters Patent, is—

1. In a motor-truck, carrying-wheels, a platform hung below the axles of said wheels, a motor supported above the platform and near the front of the same, a transverse shaft having gearing for transmitting motion to the rear wheels, and connections from said motor to said shaft; said transverse shaft and its gears being located beneath the platform.

2. In a motor-truck, carrying-wheels, a platform hung below the axles of said wheels, a motor supported above and near the front of the platform, gearing for driving the rear wheels, located beneath the platform, and a connection from the motor to said gearing extending through and continuing beneath said platform.

3. In a motor-truck, carrying-wheels, a platform hung below the axles of said wheels, a transverse shaft having gears and located beneath and near the rear of the platform, connections outside of the platform from said shaft to the axle of the rear wheels, and a motor having a shaft geared to said transverse shaft.

4. In a truck, carrying-wheels, a low-hung platform, a motor mounted upon an inclined bed, and a motor-shaft extending through the platform and connected beneath the platform to gearing for driving the rear wheels of the truck.

5. In a truck, a low-hung platform or floor, a motor whose shaft extends both forwardly and rearwardly, front carrying-wheels mounted on a swiveled bogie, gearing for driving said wheels also carried by said bogie, rear carrying-wheels, gearing for driving said rear carrying-wheels, clutches, on both the forward and rearward projections of the motor-shaft, a connection between said clutches for causing them to operate simultaneously, and a lever for controlling said connection.

6. A motor-truck having front carrying-wheels and rear carrying-wheels, a motor inclined to the horizontal plane of the truck-body, a motor-shaft projecting in an inclined direction both forwardly and rearwardly, gearing above the truck-body for driving the front wheels, gearing below the truck-body for driving the rear wheels and means for controlling said gearing.

7. In a motor-truck, a platform, a swiveled pair of front carrying-wheels, an inclined motor on the front end of the platform, a motor-shaft projecting on a forward and upward incline, a horizontal driving-shaft jointed to said inclined motor-shaft beveled gearing supported independently of the platform and having connections for transmitting power to both front wheels, and a clutch on the horizontal driving-shaft for engaging and disengaging said shaft with said gearing.

In testimony whereof I have affixed my signature, in presence of two witnesses, this 15th day of November, 1904.

CARLOS SCHMIDT.

Witnesses:
F. E. MONTEVERDE,
L. W. SEELY.